United States Patent
West

(10) Patent No.: US 6,252,311 B1
(45) Date of Patent: Jun. 26, 2001

(54) LOAD SENSOR AND CONTROLLER/MANAGER

(76) Inventor: Donald L. West, 3040 Pine Ridge Rd., Winchester, KY (US) 40391

(*) Notice: Subject to any disclaimer, the term of this patent is extended or adjusted under 35 U.S.C. 154(b) by 0 days.

(21) Appl. No.: 09/405,955

(22) Filed: Sep. 27, 1999

Related U.S. Application Data

(60) Provisional application No. 60/102,794, filed on Oct. 2, 1998.

(51) Int. Cl.$^7$ .................................................. H02J 3/14
(52) U.S. Cl. ............................... 307/29; 307/39; 307/131
(58) Field of Search ........................ 307/24, 31–35, 307/39, 52–59, 62, 130, 131, 126, 140; 340/644; 361/187, 191

(56) References Cited

U.S. PATENT DOCUMENTS

| | | | |
|---|---|---|---|
| 4,466,040 | * | 8/1984 | Barthel et al. .................. 307/130 |
| 4,694,192 | * | 9/1987 | Payne et al. ..................... 307/39 |
| 4,763,015 | * | 8/1988 | St. Louis ........................ 307/126 |
| 5,436,510 | * | 7/1995 | Gilbert ............................ 307/38 |
| 5,455,733 | * | 10/1995 | Waggamon ..................... 361/115 |
| 5,506,573 | * | 4/1996 | Ewing et al. ................... 340/644 |
| 5,854,594 | | 12/1998 | Lin et al. . |
| 5,867,017 | | 2/1999 | Merwin et al. . |
| 5,898,386 | | 4/1999 | Kailhatsu . |

* cited by examiner

*Primary Examiner*—Fritz Fleming
(74) *Attorney, Agent, or Firm*—Kenneth F. Pearce

(57) ABSTRACT

A sensor remote from the load's open/close switch for detecting the initial minuscule alternating current flow across the load's open/close switch upon closure of the open/close switch. After the sensor detects the initial minuscule alternating current flow, according to a predetermined paradigm, the controller/manager activates, delays or inhibits delivery of alternating current to the load to be managed. The sensor and/or the controller/manager is easily connected to the localized preexisting circuits of either stationary dwellings or movable domiciles and is well suited for managing the numerous appliance loads commonly found in dwelling or domiciles.

20 Claims, 2 Drawing Sheets

LOAD SENSOR AND CONTROLLER/MANAGER

This application for letters patent relates back to provisional application, Ser. No. 60/102,794, West, Donald Lee, filed Oct. 2, 1998 that was entitled —LOAD MANAGER— on the date the provisional application was filed.

BACKGROUND OF THE INVENTION

1. Field of the Invention

A sensor for detecting initial alternating current flow across the load's open/close switch which can be easily combined with a controller for managing the absorption of alternating current loads of preexisting localized circuits. Within the present unity of invention, the sensor or controller/manager can be readily connected to the preexisting localized circuits found in either stationary dwellings, or movable domiciles such as, motor homes, trailers, boats or ships. The controller and/or manager include a memory which prioritizes, according to a preselected paradigm, alternating current delivery to the various appliances, such as, heat pumps, furnaces, air conditioners, water heaters, dryers, ranges and/or refrigerators connected to their corresponding preexisting circuits. Although it has been determined the sensor, as well as the controller/manager, can be advantageously and conveniently coupled to the preselected localized circuits having loads to be managed at the primary source of alternating current, such as, the circuit breaker or fuse box, it is within the scope of the present invention, for the sensor or the controller/manager to be connected at any location remote from the open/close switch of the appliance load to be managed. In combination with the various appliances' open/close switches coupled, in series, via their corresponding localized preexisting circuits to the manager, the present invention can activate, delay or inhibit operation of the appliances, in accordance with the preselected paradigm.

2. Description of the Previous Art a) U.S. Pat. No. 5,854,594 Lin, et. al., enables a remote control which transmits an infrared signal to activate or deactivate electronic devices such as televisions or audio systems. The operator of Lin's keypad generates infrared codes to control the selected electronics. In the art, Lin discloses what is known commonly as a universal controller, since the controller can function with a multitude of electronics, regardless of manufacturer of the electronics.

b) U.S. Pat. No. 5,898,38 Kaihatsu mandates an electronic control system for camera-integral VTR. Operation of the keypad, causes the VTR to rewind, play, fast-forward, stop, so forth and so on. Kaihatsu's novel feature appears to be the identifying signal which is specific for each VTR and its respective remote controller, thereby preventing accidental activation of other electronic devices. Additionally, the specific identifying signal is only locked in after keypad controller initially activates the VTR.

c) U.S. Pat. No. 5,867,017 Merwin, et. al., teaches a control system for electric ballast powering fluorescent lamps. Via an existing traveler wire of conventional three-way or four-way switches, push buttons coupled to the traveler wire are connected to Merwin's master controller. When an operator activates Merwin's set of push buttons, a pulse transmitter sends an encoded signal along the traveler wire to the master controller to activate, deactivate or dim the respective fluorescent lamp or lamps. Thereafter, Merwin's master controller sends an encoded command signal specific to the fluorescent lamp to be activated, deactivated or dimmed to the lamp's receiver.

SUMMARY OF THE INVENTION

The present invention includes a sensor or sensors for detecting minuscule amperages flowing across open/close switches of loads. Within the present unity of invention, utilizing the current sensors with a controller allows for load management of loads which have been connected to their corresponding localized preexisting circuits. Examples of appliance loads successfully managed by the controller include those loads attributable to such devices as heat pumps, furnaces, air conditioners, water heaters, dryers, ranges and refrigerators, to name a few of the multitude of manageable loads. Within the scope of the present invention, any number of loads from 1 to infinity less 1 can be managed. And loads associated with these commonplace appliances can range from about 4 amperes to about 50 amperes or more. Importantly, it has been discovered that the present sensor while remote from the load's open/close switch can detect initial minuscule current flow across the load's open/close switch, when the initial current flow is at a rate less than 0.00251% of the load's maximum amperage.

In accordance with the present invention, the sensor and the controller/manager function in combination with the indigenous localized preexisting circuits found in either stationary dwellings or movable domiciles. Generally, the localized preexisting circuits consist of commercially available Underwriters Laboratories approved copper or copper-type wiring, but the present invention is functional with other species of lines which may define the localized preexisting circuit. Most advantageously, the controller meets the long felt but previously unfilled need for a sensor and its corresponding controller which could be attached to the preexisting circuit at any location remote from the open/close switch of the load to be managed. Therefore, costly rewiring of dwellings or domiciles is unnecessary to practice the present invention. At the same time, for convenience, the controller is frequently located near the primary source of alternating current, i.e., the circuit breaker or fuse box. Representative voltages of primary sources of the alternating currents utilized in combination with present invention are 120, 240, 480 forward current volts, as well as, from about 160 to about 900 reverse breakdown volts. However, in view of this enabling disclosure, those competent in the art will recognize the controller can be readily configured to operate with other voltages and/or loads to be managed.

In the prior art, previous controllers required a user interface to activate or deactivate any load to be managed. However, within the scope of the present invention, by employing either the controller's memory or microprocessor, the requirement of a user interface is abolished. Thus, dependent upon a predetermined paradigm, a priority of load delivery can be relayed to and between various appliances from the single primary source of alternating current supplying the localized preexisting circuits.

An example of a predetermined paradigm is: when the range is on, load to the dryer is delayed while load to the water heater is inhibited, until the range is off. Another example of a predetermined pattern is: when loads are delivered to the air conditioner and the range, loads to the refrigerator and the water heater are delayed. Yet another example of a predetermined model is: the water heater absorbs load only during the overnight hours, unless its load is delayed because it is overridden by the furnace load. Still another example of a predetermined paradigm is: while starting a heavy duty motor, other lighter loads are inhibited or temporarily delayed, for a predetermined time. In short, in accordance with the present invention, an almost endless number of parameters can dictate the predetermined paradigm for load delivery, delay or inhibition.

Within the scope of the present invention, it has also been unexpectedly discovered that the controller can detect as few as 50 microamperes of current flowing across the load's open/close switch, when the controller is coupled at a location remote from the open/close switch. And depending upon the components selected to construct the load manager, the sensor's sensitivity can also detect current flowing over the load's open/close switch in the range of from about 2 to about 10 milliamperes or more. Those skilled in the art understand that whether the controller is set to sense microamperes or milliamperes, either of those currents is minuscule, when compared to total load required to activate the corresponding function of the activated load. Therefore, in accordance with the present invention, when the manager detects these minuscule currents flowing across the load's open/close switch, the manager thereafter activates, delays or inhibits the delivery of the required load to the open/close switch which has been closed.

An object of the present invention to provide a sensor that will detect minuscule amperages flowing across an open/close switch upon closure of the open/close switch.

It is another object of the present invention to provide a sensor connected to its corresponding localized preexisting circuit at a location remote from the corresponding load's open/close switch.

Still another object of the present invention is to provide a controller/manager that will more efficiently manage power consumption.

Yet another object of the present invention is to cost-effectively prioritize load management such that the heavier loads to be absorbed can be drawn at a time when the power supplied is less expensive.

It is yet another object of the present invention is to provide a controller/manager remote from the open/close switch of the load to be managed.

Still another object of the present invention is to provide a sensor/controller/manager functional with the indigenous wiring of permanent dwellings or movable domiciles.

Yet another object of the present invention is to provide a sensor/controller/manager functional with localized preexisting circuits.

Yet still another object of the present invention is to provide a sensor/controller/manager capable of detecting initial current flow across the load's open/close switch in the range of from about 50 microamperes to about 10 or more milliamperes.

It is another object of the present invention to provide a controller which manages a 1 kilowatt load while only dissipating power in the range of from about 0.000250% to about 0.000600%.

It is yet another object of the present invention to provide a controller which manages a 1 kilowatt load while only dissipating power in the range of from about 0.000576% per full wave cycle.

It is still another object of the present invention to provide a controller which manages a 1 kilowatt load while only dissipating power in the range of from about 0.000288% per half wave cycle.

Yet still another object of the present invention is to provide a sensor that can detect amperage across the load's open/close switch where the sensor can sense current flow in the range of less than 0.251% of the load's maximum amperage.

Yet another object of the present invention to provide a load manager including either a memory or a microprocessor for prioritizing load management.

It is still another object of the present invention to provide a load manager which can be preprogrammed in accordance with a predetermined paradigm.

As used herein, "localized preexisting circuit" shall mean the circuit defined by the preexisting lines between the load to be managed, including the lines of the load coupled to preexisting lines of the stationary dwelling or movable domicile, and the fuse box or circuit breaker of the stationary dwelling or movable domicile.

As used herein, with respect to a load, when reference is made to "inhibition, inhibits or inhibited," it shall mean that a first load is completely prevented from absorbing current, until another load has completed its load absorption, in accordance with the predetermined paradigm of the other load, i.e., the first load is inhibited from absorbing current as long as the other load is absorbing current.

As used herein, with respect to a load, when reference is made to "delay or delayed," it shall mean that a first load is delayed in its load absorption, until another load has absorbed its load for a predetermined time, in accordance with the predetermined paradigm of the other load, i.e., the first load is delayed from absorbing current, until the other load has absorbed current for a predetermined time; after the predetermined time has passed, both the first and the other load can absorb current.

As used herein, with respect to a load, when reference is made to "activation, activates or activated" it shall mean power is supplied to its corresponding load.

One embodiment of the present unity of invention can be described as the combination of the load's open/close switch coupled with a localized preexisting circuit and a sensor where the sensor detects initial alternating current flow across the open/close switch and where the sensor is connected to the localized preexisting circuit at a location remote from the open/close switch.

Another embodiment of the present invention can be described as a controller for managing absorption of alternating current for a load comprising the combination of: a plurality of localized preexisting circuits having at least one load to be managed and its open/close switch coupled to its corresponding localized preexisting circuit where the corresponding controller is remote from its corresponding open/close switch and wherein the controller further includes: a sensor for detecting closing or opening of its corresponding open/close switch; a relay for supplying alternating current for powering the load to be managed; a memory for delaying or inhibiting delivery of alternating current to the remainder of the plurality of localized preexisting circuits; and a source of direct current powering said sensor and said memory.

Another representation of the present invention can be pictured as a load manager for managing absorption of alternating current of at least two loads comprising the combination of: a plurality of localized preexisting circuits having first and second controllers coupled to their corresponding localized preexisting circuits, where the controllers are remote from their corresponding open/close switches of their corresponding loads to be managed. First and second controllers detect minuscule current flows over their corresponding open/close switches, when their corresponding open/close switches are closed, and thereafter signal a memory of their corresponding detections, wherein the memory instructs the controllers to activate, delay or inhibit their corresponding loads.

Still another embodiment the present invention includes a load manager for managing absorption of alternating current of at least three loads comprising the combination of: a plurality of localized preexisting circuits having at least three controllers coupled to their corresponding localized preexisting circuits where the controllers are remote from their corresponding open/close switches of their corresponding loads to be managed. Each controller detects minuscule current flows over its corresponding open/close switches, when its corresponding open/close switches are closed, such that each controller thereafter signals a microprocessor of its corresponding detection, wherein the microprocessor instructs the controllers to activate, delay or inhibit their corresponding loads.

It is the novel and unique interaction of these simple elements which creates the above referenced embodiments, within the ambit of the present invention, as well as others not specifically set forth. Pursuant to Title of the United States Code, descriptions of preferred embodiments follow. However, it is to be understood that the best mode descriptions do not limit the scope of the present invention. The breadth of the present invention is identified in the claims appended hereto.

DESCRIPTION OF THE PREFERRED EMBODIMENTS

Although the disclosure hereof is detailed to enable those skilled in the art to practice the invention, the embodiments published herein merely exemplify the present invention which can be practiced in other specific structures.

Figure 1:
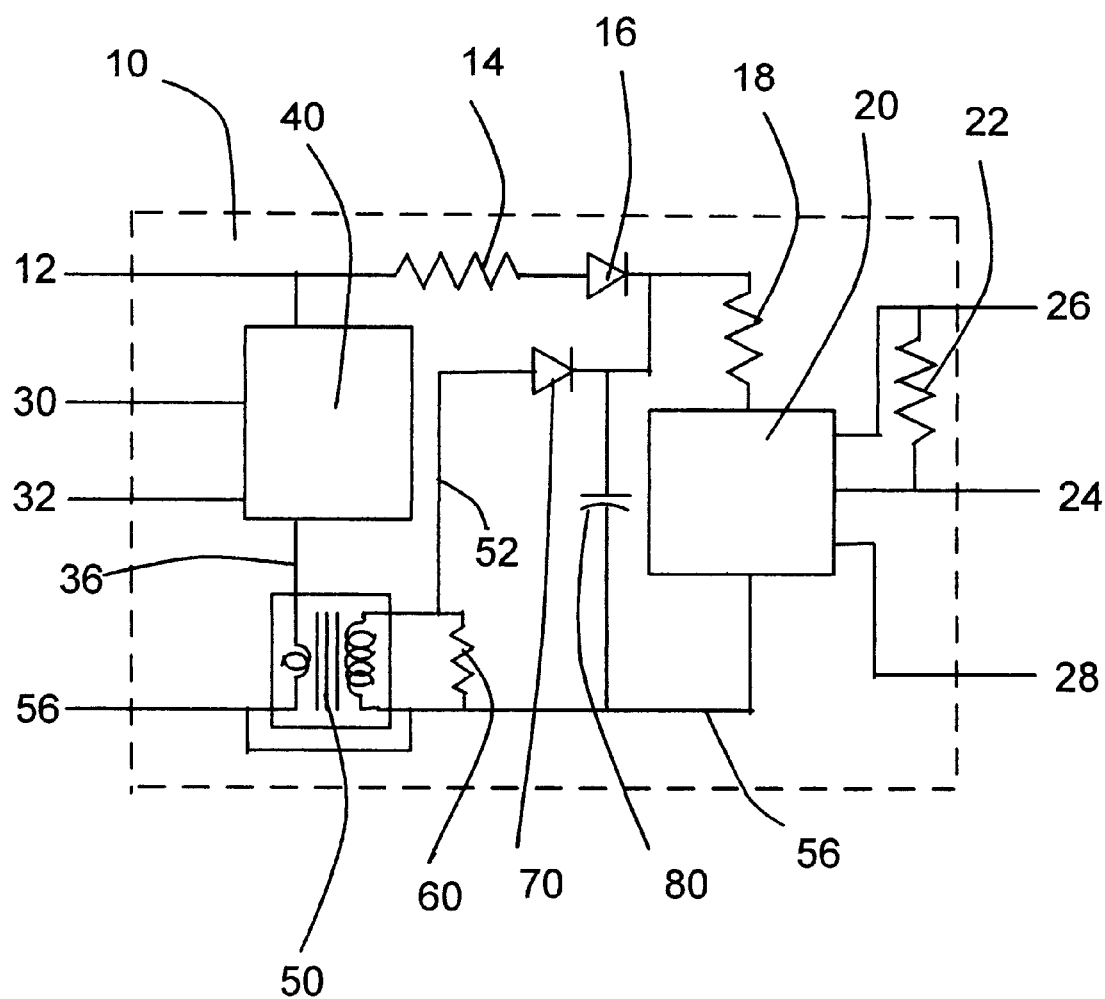
FIG. 1 is a schematic depiction of the sensor and controller of the present invention.

Looking at FIG. 1, an abstraction of the present invention is schematically depicted, and specifically, controller (10) is diagramatically represented inside the broken-line rectangle. As shown, the high voltage line (12), e.g., the hot wire of the preexisting circuit, is coupled with relay (40) and resistor (14). In this representation, to reduce high inrush currents and voltage spikes associated with reactive loads, relay (40) is zero voltage turn on/off solid state. Resistor (14) is also connected to diode (16) which is further linked with resistor (18) that is thereafter connected to sensor (20). Depending upon the type of load to be managed, resistance values for resistors (14) and (18) vary with respect to the load absorption of, for example, the appliance. But within the ambit of the present embodiment, it has been discovered that a resistance value of 27 kiloohmns for resistor (14) and 220 ohms for resistor (18) function efficiently with sensor (20).

Figure 2:
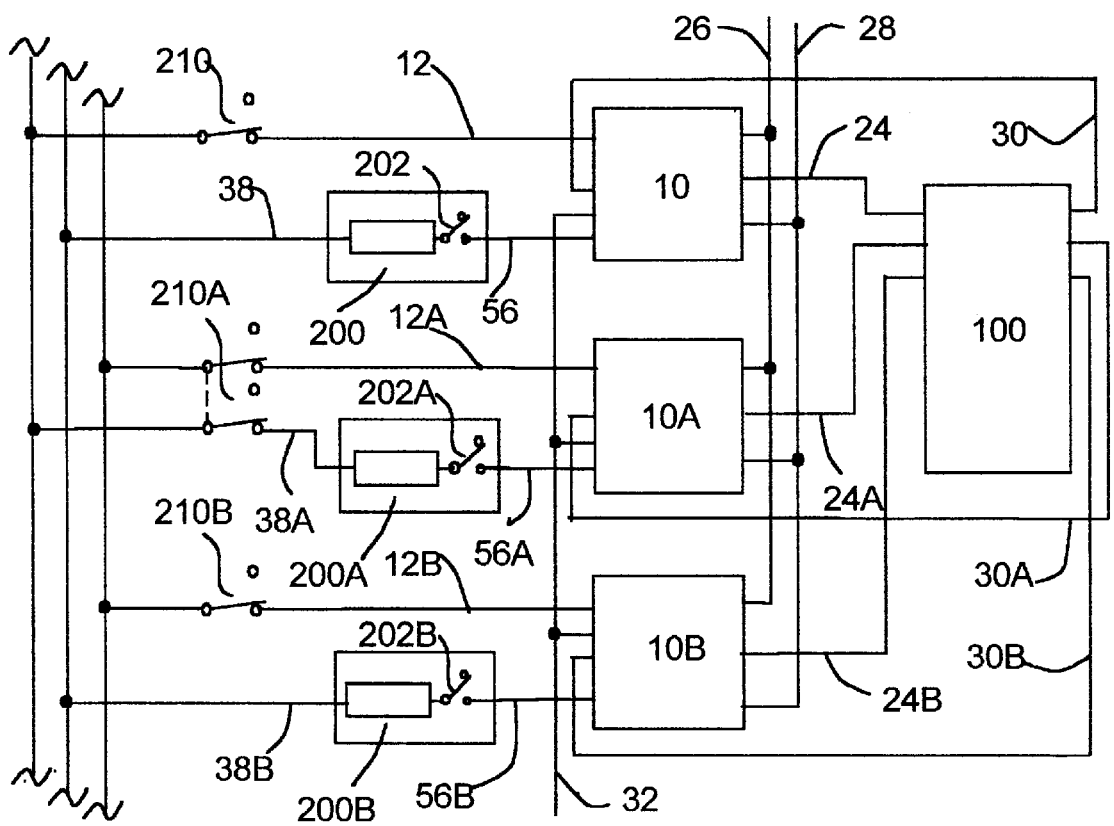
FIG. 2 is a diagrammatic representation of the localized preexisting circuits and their corresponding controllers and/ or managers.

Turning toward both FIGS. 1 and 2, in this particular embodiment, sensor (20) is a N1138 optoisolator. However, in view of the present Specification, those skilled in the art, will comprehend other sensors capabable of detecting from 50 microamperes to 10 milliamperes or more of current flowing across an open/close switch (202) of load (200) to be managed (see FIG. 2) fall within the scope of the present invention. And although sensor (20) is an electro-optical sensor, other sensors detecting current flow, within the aforenoted ranges, across the load's open/close switch (202) can replace the optoisolator.

Continuing with reference to FIG. 1, line (28) is the ground for controller (10). Resistor (22) is coupled between output line (24) and line (26), and in this express representation, resistor (22) has a resistance of 2.2 kiloohms. However, as shown in FIG. 2, controller (10) can be constructed to eliminate resistor (22) and line (26), thereby resulting in output line (24) being joined directly to memory (100).

With reference to both FIGS. 1 and 2, relay (40) is provided with ground (32). Memory (100) is coupled to relay (40) via input line (30). Additionally, line (36) joins relay (40) to transformer (50). And low voltage line (56) of localized preexisting circuit leads to open/close switch (202) of load (200) to be managed.

Returning to FIG. 1, via line (52), transformer (50) sends low power pulses through resistor (60) to diode (70) and capacitor (80) while line (56) completes the circuit between sensor (20) and transformer (50). In accordance with the present invention, a battery can supply direct current to sensor (20), but as shown in FIGS. 1 and 2, the combination of transformer (50), resistor (60), diode (70) and capacitor (80) supply direct current voltage to sensor (20). And when current is delivered over open/close switch (20), this combination of transformer (50), resistor (60), diode (70) and capacitor (80) can supply direct current to sensor (20), until open/close switch (202) is opened. In this particular embodiment, resistor (60) has a resistance of 430 ohms, capacitor (80) has a capacitance of from about 3.5 microfarads to about 80 microfarads, and the resistance of controller (10) ranges from about 10,000 ohms to about 220,000 ohms. However, those proficient in the art, in view of this Specification, understand all components of controllers (10), (10A) and/or (10B) may be modified to accommodate their corresponding loads (200), (200A) and/or (200B) to be managed. Further, those skilled in the art recognize the loads to be managed supply a constant to the innumerable perimeters which can be factored into the paradigm for the load manager of the present invention.

Returning to FIG. 2, circuit breaker (210), high voltage line (12), low voltage line (38), load (200) and its corresponding open/close switch depict the lines of one preexisting circuit. Circuit breaker (210A), high voltage line (12A), low voltage line (38A), load (200A) and its corresponding open/close switch portray the lines of a second preexisting circuit. And still in accordance with the present invention, circuit breaker (210B), high voltage line (12B), low voltage line (38B), load (200B) and its corresponding open/close switch show the lines of a third preexisting circuit. Importantly, the number of localized preexisting circuits and their corresponding preexisting loads (200, 200A, 200B, 200C, 200D, 200E, ad infinitum) can range from 1 to infinity less 1.

Depending upon the utilizer's preference, management of preselected loads (200), (200A) and (200B) can be accomplished by exploiting the predetermined paradigms of either memory (100) or microprocessor (100). An explication of a predetermined paradigm is: delivery of current to load (200) is inhibited and delivery of current to load (200A) is delayed while load (200B) is activated. And as previously disclosed herein, the parameters defining the paradigm for each load's absorption is virtually unlimited.

By way of illustration, in FIG. 2, according to the predetermined paradigm for the load manager, controllers (10), (10A) and (10B) manage their respective preselected loads (200), (200A) and (200B). When any of open/close switches (202), (202A) and/or (202B) are closed, corresponding sensors (20), (20A) and/or (20B) of controllers (10), (10A) and/or (10B) detect the previously identified minuscule current flowing over switches (202), (202A) and/or (202B). Thereafter, sensor (20), (20A) and/or (20B) send their corresponding detection signals via output lines (24), (24A) and/or (24B) to microprocessor (100). Upon receipt of the corresponding detection signals and in accordance with the predetermined paradigm, microprocessor (100) through input lines (30), (30A) and/or (30B) signals analogous relays (40), (40A) and/or (40B) of controllers (10), (10A) and/or (10B) to inhibit, delay or activate current flow over open/close switches (202), (202A) and/or (202B) and their corresponding localized preexisting circuits.

Having disclosed the invention as required by Title 35 of the United States Code, Applicant now prays respectfully that Letters Patent be granted for his invention in accordance with the scope of the claims appended hereto.

What is claimed is:

1. In combination, a controller, with a localized preexisting circuit, for detecting an initial alternating current flow across a load's open/close switch and for managing subsequent alternating current flow across said load's open/close switch, said combination comprising:
   a) said localized preexisting circuit coupled with said load's open/close switch: and
   b) said controller connected to said localized preexisting circuit at a location remote from said load's open/close switch, wherein said controller further comprises:
      i) a memory coupled to an electro-optical sensor for receiving input from said electro-optical sensor; and
      ii) a sub-combination, including a relay, for receiving management output signals supplied by said memory, wherein said relay manages said subsequent alternating current flow across said load's open/close switch and supplies direct current to said electro-optical sensor.

2. The invention of claim 1 wherein the maximum amperage absorbable by said load is 50 amperes or less.

3. The invention of claim 2 wherein said electro-optical sensor initially detects less than 0.0250% of said load's maximum amperage across said load's open/close switch.

4. The invention of claim 3 wherein said sub-combination further comprises a transformer.

5. The invention of claim 4 wherein said controller is located at or about said localized preexisting circuit's primary source of power.

6. The invention of claim 5 wherein said electro-optical sensor detects said initial alternating current flow across said load's open/close switch in the range of from about 50 microamperes to about 2 milliamperes.

7. The invention of claim 6 wherein said sub-combination further includes:
   a) at least two resistors; and
   b) at least one diode.

8. In combination, a first controller for detecting an initial alternating current flow across a first load's open/close switch and for managing subsequent alternating current flow across said first load's open/close switch, said combination comprising:
   a) a plurality of localized preexisting circuits wherein said first controller is connected to a first localized preexisting circuit at a location remote from said first load's open/close switch; and
   b) said first controller further comprising:
      i) a memory coupled to a first electro-optical sensor for receiving input from said first electro-optical sensor; and
      ii) a first sub-combination, including a first relay, for receiving management output signals supplied by said memory, wherein said first relay manages said subsequent alternating current flow across said first load's open/close switch and supplies direct current to said first electro-optical sensor.

9. The invention of claim 8, said first controller's first sub-combination further comprising a transformer.

10. The invention of claim 9 wherein said first controller is located at or about said first localized preexisting circuit's primary source of power.

11. The invention of claim 10 wherein said first electro-optical sensor detects less than 0.250% of said first load's maximum amperage.

12. The invention of claim 11 wherein said first electro-optical sensor detects said initial alternating current in the range of from about 50 microamperes to about 2 milliamperes crossing said first load's open/close switch.

13. In combination, a load manager for managing absorption of alternating current of a first and a second load, said combination comprising:
   a) a plurality of localized preexisting circuits;
   b) a first controller remote from a first load's open/close switch for detecting closure of said first load's open/close switch of a first localized preexisting circuit and thereafter activating, delaying or inhibiting relay of said alternating current over said first load's open/close switch;
   c) a second controller remote from a second load's open/close switch for detecting closure of a second load's open/close switch of a second localized preexisting circuit and thereafter activating, delaying or inhibiting relay of said alternating current over said second load's open/close switch
   d) a memory coupled to said first and said second controllers for managing delivery of said alternating current over said first load's open/close switch and said second load's open/close switch wherein management of activation, delay or inhibition of each of said controllers is dependent upon a predetermined paradigm stored in said memory;
   e) said first controller further comprising a first sub-combination including a first electro-optical sensor and a first relay, for receiving management output signals supplied by said memory, wherein said first relay manages said subsequent alternating current flow across said first load's open/close switch and supplies direct current to said first electro-optical sensor; and
   f) said second controller further comprising a second sub-combination including a second relay.

14. The invention of claim 13 wherein said memory is a function of a microprocessor.

15. The invention of claim 14, each of said first and second sub-combinations further comprising a transformer.

16. The invention of claim 15 wherein said first sub-combination further includes:
   a) at least two resistors; and
   b) at least one diode.

17. In combination, a load manager for managing absorption of alternating current of at least three loads, said combination comprising:
   a) at least three localized preexisting circuits:

b) a first controller remote from a first load's open/close switch for detecting closure of said first load's open/close switch of a first localized preexisting circuit and thereafter activating, delaying or inhibiting relay of said alternating current over said first load's open/close switch;

c) a second controller remote from a second load's open/close switch for detecting closure of a second load's open/close switch of a second localized preexisting circuit and thereafter activating, delaying or inhibiting relay of said alternating current over said second load's open/close switch;

d) a third controller remote from a third load's open/close switch for detecting closure of a third load's open/close switch of a third localized preexisting circuit and thereafter activating, delaying or inhibiting relay of said alternating current over said third load's open/close switch;

e) a microprocessor coupled to said first, said second and said third controllers for managing delivery of said alternating current over said first load's, said second load's and said third load's open/close switches, wherein management of activation, delay or inhibition of each of said controllers is dependent upon a predetermined paradigm stored in said microprocessor;

f) said first controller further comprising a first sub-combination including a first electro-optical sensor and a first relay, for receiving management output signals supplied by said memory, wherein said first relay manages said subsequent alternating current flow across said first load's open/close switch and supplies direct current to said first electro-optical sensor;

g) said second controller further comprising a second sub-combination including a second relay; and h) said third controller further comprising a third sub-combination.

18. The invention of claim 17, each of said first, second and third sub-combinations further comprising a transformer.

19. The invention of claim 18 wherein;

a) said first sub-combination further includes a resistor and a diode;

b) said second sub-combination further includes a resistor and a diode; and c) said third sub-combination further includes a resistor and a diode.

20. The invention of claim 19 wherein said first electro-optical sensor detects said initial alternating current in the range of from about 50 microamperes to about 2 milliamperes crossing said first load's open/close switch.

* * * * *